Figure 1:
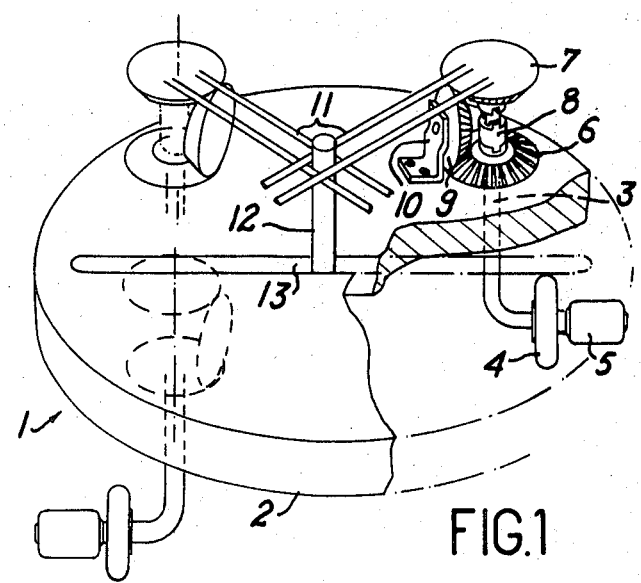

United States Patent

[11] 3,570,615

| | | | |
|---|---|---|---|
| [72] | Inventors | Jean-Pierre Guilbaud Jouars Ponchartrain; Jean Vertut, Paris, France | |
| [21] | Appl. No. | 812,682 | |
| [22] | Filed | Apr. 2, 1969 | |
| [45] | Patented | Mar. 16, 1971 | |
| [73] | Assignee | Commissariat A L'Energie Atomique Paris, France | |
| [32] | Priority | Apr. 9, 1968 | |
| [33] | | France | |
| [31] | | 147,475 | |

[54] SYSTEM FOR CONTROLLING THE APPLICATION OF MOTION OF VEHICLE WHEELS
3 Claims, 3 Drawing Figs.

[52] U.S. Cl....................................................... 180/1, 180/6.5, 180/45, 180/79.1
[51] Int. Cl....................................................... B601 15/00
[50] Field of Search............................................ 180/79.1, 45, 6.5, 6.48, 1; 280/91, 96

[56] References Cited
UNITED STATES PATENTS

| | | | |
|---|---|---|---|
| 1,495,788 | 5/1924 | Franz............................ | 180/6.5UX |
| 3,288,232 | 11/1966 | Shepherd....................... | 180/1 |
| 3,481,417 | 12/1969 | Jarret et al..................... | 180/6.5 |

Primary Examiner—Kenneth H. Betts
Attorney—Cameron, Kerkam & Sutton

ABSTRACT: A system for controlling the application of motion to vehicle wheels disposed at the vertices of a polygon which is located in one plane and which can be inscribed within a so-called base circle, each wheel being associated with means for individual driving about its rotational axis. Any two adjacent wheels are driven with a speed ratio corresponding to the ratio of the lengths of straight line segments cut on the chord of the base circle which joins the pivotal axis of the two wheels by the line bisecting the angle defined by the two directions which connect the center of rotation to the two axes in said plane.

PATENTED MAR 16 1971　　　　　　　　　　　　　　　　　　　　3,570,615

SYSTEM FOR CONTROLLING THE APPLICATION OF MOTION OF VEHICLE WHEELS

The present invention relates to an improvement which is made in systems for controlling the application of motion to vehicle wheels whereby the speeds of rotation of said wheels are made compatible with each other as a function of their mutual orientations, that is to say of the position of the center of rotation of said vehicle at each moment.

There was described in patent application Serial No. 812,037, filed Apr. 1, 1969 by applicants herein a set of arrangements for controlling the orientation of wheels about their pivotal axes in such a manner that the center of rotation of the vehicle can be displaced to any point of the so-called base plane which passes through the centers of all of said wheels, provision being made of any desired number of wheels. In the most simple case, it has been considered that the pivotal shafts associated with the wheels were all parallel and that the centers of the wheels were disposed at the vertices of a polygon which can be inscribed within a circle. Taking this case as an example, there was described a system whereby the center of rotation of the vehicle could be caused to correspond at each moment to its transformed point or to the harmonic conjugate of said point relative to a reference circle which is deduced from the base circle by means of a given geometrical transformation, thereby placing the center of rotation either inside or outside the base circle according to requirements.

The present invention is directed to a device for controlling the application of motion to the wheels of a vehicle and for imparting to said wheels an instantaneous speed of rotation which is coherent with the relative orientation thereof according to the position given to the center of rotation or in other words according to the value of their respective turning radii.

To this end, said system in which each wheel is associated with a means for individual driving of said wheel about the rotational axis thereof is characterized in that any two adjacent wheels are driven with a speed ratio which is in the same ratio as the lengths of straight-line segments cut on the chord of the base circle which joins the pivotal axes of the two wheels by the line bisecting the angle defined by the two directions which connect the center of rotation to the two axes in said plane.

In a preferred mode of execution, the invention consists in associating the transformed point of the center of rotation inside a reference circle deduced from the base circle by means of a given geometrical transformation with three forks which meet at said point and two of which connect said point to points representing the positions of the pivotal axes of the wheels whilst the third point materializes by means of a deformable lozenge system the position of the line bisecting the angle formed by the first two forks, said third fork being adapted to displace along the chord which connects said points the sliding contact of a linear potentiometer whose resistor extends parallel to said chord.

Figure 2:
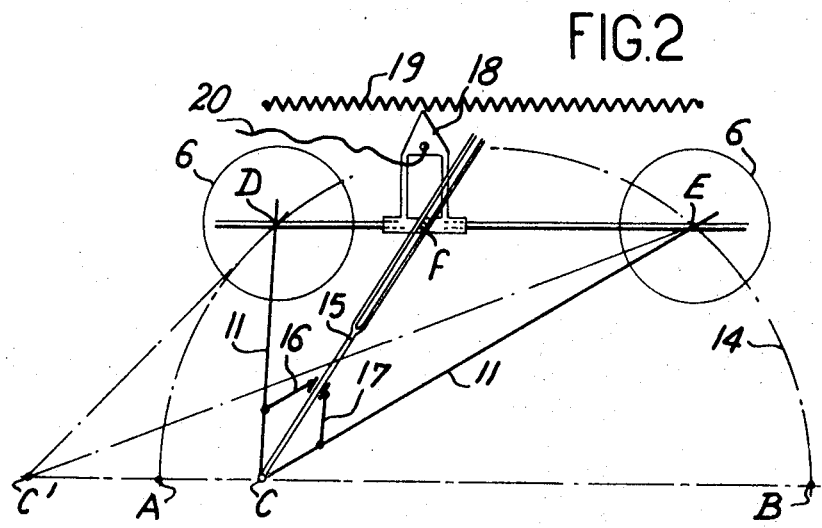

Further characteristics of the invention will be brought out by the following description of one exemplified embodiment which is given by way of indication and not in any limiting sense, reference being made to the accompanying drawings, wherein:

FIG. 1 is a diagrammatic view of a vehicle equipped with a system for controlling the steering of said wheels as designed in accordance with the arrangements provided in the patent application cited hereinabove; and FIG. 2 is a general diagram of a speed control apparatus in accordance with the present invention for the vehicle of FIG. 1.

The vehicle 1 which is shown in FIG. 1 essentially comprises a frame 2 which supports parallel pivotal shafts 3 for wheels 4, two only of which having been shown in order not to complicate the drawings, provision being made for any desired number of wheels and pivotal shafts. Each wheel 4 is associated with an individual driving motor 5 which drives said wheel in rotation about its own axis, it being understood that any other similar arrangement could be contemplated provided that the application of rotary motion to the wheels can be regulated separately in the case of each wheel. Two superposed pinions 6 and 7 which have the same diameter are mounted on each shaft 3 and are alternatively couplable to this latter by means of a sliding key 8 secured to the shaft and provided with dogs which are adapted to engage in recesses of corresponding dimensions formed in the pinions 6 or 7. In addition, these two pinions are coupled by means of a planetary pinion 9 which is freely mounted on a shaft carried by a plate 10 fixed on the frame 2. Each upper pinion 7 is rigidly fixed to a fork 11, the extremity of which is adapted to cooperate with a control pin 12 which is common to all the forks. Said control pin is capable of displacement under the action of actuating means (not shown in the drawings) within a slot 13 formed in the frame 2. By design, all the pivotal shafts 3 are parallel to each other and so disposed that the centers of the pinions 6 and 7 are respectively located on a base and reference circle in parallel planes which are derived from each other by means of a translation in the direction of the axes of shafts 3, the amplitude of which is equal to the diameter of the planetary pinion 9. Finally, the slot 13 for the control pin 12 extends along a diameter of the base circle on which the pinions 6 lie. Alternatively, the slot 13 may extend along the corresponding diameter of the reference circle. Depending on the keyed coupling of the pivotal shafts 3 to either one or the other of the associated pinions 6 or 7, the preceding arrangements can permit the base point corresponding to the center of rotation of the vehicle to correspond to a transformed point thereof within the reference circle or to the conjugate of said transformed point by virtue of the convergence of the forks 11 towards the control pin 12 within the slot 13.

There is shown at 14 in FIG. 2 the above-mentioned reference circle which passes through the centers of the two adjacent pinions 7, it being understood that the following description applies equally to all the other pinions and to corresponding pinions on the base circle. On the reference circle 14, the points A and B indicate the ends of a diameter along which is displaced the control pin 12, the axis of which is designated by the reference C. The centers of the pinions 7 considered are designated on this circle by the references D and E.

By means of the apparatus which is illustrated by way of example in FIG. 1 and has already been stated in the above referred to application the point corresponding to the center of rotation of the vehicle is related alternately to the point C inside the reference circle which is the transformed point thereof within the reference circle or the point C' which is the harmonic conjugate of C with respect to said reference circle, depending on whether said base point is to be located either inside or outside the base circle for the purpose of controlling the steering of the vehicle.

When the base point corresponds to the center of rotation of the vehicle corresponds to the point C, it is apparent that the ratio of driving speeds of the two wheels which are associated with the points D and E on the reference circle is equal to the ratio of the length CD to the length CE. When the base point is located outside the base circle, said point accordingly corresponds to the point C' which is the conjugate of the point C with respect to the reference circle 14. In this case, the ratio of driving speeds is equal to that of the segments C'D and C'E. However, because C' is the conjugate of C the ratio of the segments C'D and C'E is exactly equal to the ratio of CD to CE. Thus the magnitude of this ratio depends only on the position of the point C on the diameter AB and can be represented by the ratio of the length D$f$ and $f$E cut on the chord DE by the line C$f$ bisecting the angle $\overline{DCE}$ which meets said chord DE at the point $f$.

In accordance with the invention it is accordingly necessary only to couple the point $f$ mechanically to the displacement of the point C on the diameter AB by making use, for example, of a fork 15 whose orientation remains continuously that of the line bisecting the angle $\overline{DCE}$. To this end, the straight lines DC and EC which represent the two forks 11 of FIG. 1 corresponding to the two adjacent wheels considered are joined to the fork 15 by means of two link rods 16 and 17 forming an articulated parallelogram and the fork 15 constitutes a diagonal line of said parallelogram. There is slidably mounted on the straight line DE a movable contact 18 of a linear potentiometer whose resistor 19 extends parallel to the straight line DE. The voltages thus collected from said potentiometer by the movable contact 18 and transmitted by the electrical connection 20 are in the desired ratio under these conditions. By means of any suitable followup arrangement (not shown in the drawings), said voltages can then serve to control the motors 5 for driving the wheels 4; the speed of rotation of said motors is constantly proportional to the electric voltages delivered by the sliding contact 18 and measured with respect to any given reference voltage. By varying the value of said reference voltage, the mean velocity of all the wheels can therefore be varied while retaining at each moment their ratio which is made compatible with the orientation of the wheels and consequently with the turning radius which is imparted thereto.

There is thus provided a rotary drive arrangement which is similar to a mechanical differential but has one essential advantage over this latter: should one of the wheels no longer be in contact with the rolling plane of the vehicle or should there be any reduction in adhesion of said wheel to the ground, the velocity of the other wheel with respect to which the velocity of the first wheel is determined is consequently not affected. Moreover, it is worthy of note that no special assumption has been made in regard to the relative position of the pivot axes of the wheels on the base circle or in regard to the number of said wheels.

It will be readily understood that the invention is not limited to the details of the embodiment hereinabove described with reference to the accompanying drawings but is intended to include all alternative forms within the scope of the appended claims. In particular, it is self-evident that, in order to adapt the apparatus for the purpose of achieving the coordination of any given number $n$ of wheels, it is only necessary to establish between said wheels $(n - 1)$ connections of the type hereinabove described either by selecting the speed of one wheel as a reference and by coordinating the other wheels with respect to this latter or by effecting coordinations by pairs of wheels and by establishing connections of the same type between said pairs.

We claim:

1. Apparatus for controlling the speed of rotation of the wheels of a vehicle in which the pivot vertical axes of the wheels intersect a base plane at the vertices of a base polygon which can be inscribed within a base circle, the base plane being parallel to a plane passing through the axes of rotation of the wheels and corresponding to a reference circle in a reference plane by a geometrical transformation, comprising means for causing the rotational axes of the wheels to continuously converge towards a common point which is the center of rotation of the vehicle and lies on the axis of rotation of the vehicle, the rotational axis of the vehicle intersecting the base plane at a base point which is related alternatively to a transformed point in the reference circle related thereto by the said geometrical transformation and to the conjugate of the transformed point with reference to the reference circle, individual means for each wheel for rotating it about its rotational axis, and means for controlling each individual rotating means for driving any two wheels with a speed ratio equal to the ratio of the lengths of straight-line segments on a chord of the base circle which joins the pivotal axes of the two wheels, formed by a line bisecting the angle subtended by the chord at the base point.

2. Apparatus in accordance with claim 1, said control means including three bifurcated members which meet at said transformed point and two of said members connecting said transformed point to the two vertices of said reference circle corresponding to the pivot axes of said two wheels, the third of said members being held by a deformable parallelogram linkage in the position of the line bisecting the angle between said two bifurcated members, said third member moving along the chord which connects said vertices, a sliding contact of a linear potentiometer whose resistor extends parallel to said chord.

3. A system in accordance with claim 2, each of said wheels being driven by an electric motor and the rotation of said motor being controlled by a voltage which is proportional to the voltage at the sliding contact of the potentiometer relative to a variable reference voltage.